United States Patent [19]
Takahashi et al.

[11] Patent Number: 6,125,899
[45] Date of Patent: Oct. 3, 2000

[54] HEAVY DUTY PNEUMATIC RADIAL TIRE FOR RUNNING ON ROUGH GROUND SURFACE

[75] Inventors: Ken Takahashi; Norio Ohmoto, both of Hiratsuka, Japan

[73] Assignee: The Yokohama Rubber Co., Ltd., Tokyo, Japan

[21] Appl. No.: 09/023,487

[22] Filed: Feb. 13, 1998

[30] Foreign Application Priority Data

Feb. 17, 1997 [JP] Japan ................................. 9-032389

[51] Int. Cl.⁷ .................. B60C 9/18; B60C 9/20; B60C 9/28
[52] U.S. Cl. .................. 152/527; 152/526; 152/534; 152/538
[58] Field of Search .................. 152/526, 527, 152/534, 535, 538

[56] References Cited

U.S. PATENT DOCUMENTS 5,327,954  7/1994  Nakamura .................. 152/534 X

Primary Examiner—Adrienne C. Johnstone
Attorney, Agent, or Firm—Arent Fox Kintner Plotkin & Kahn

[57] ABSTRACT

In a heavy duty pneumatic radial tire, at least one carcass layer is provided between right and left bead portions and at least two belt layers formed of steel cords which exhibit a breaking elongation of 4% or less are arranged in an outer periphery of the carcass layer in a tread portion. The belt layers are composed of at least one upper belt layer (A) and at least one lower belt layer (B). The upper belt layer (A) has a belt width that is 0.6 times or less a carcass line maximum width SW of the carcass layer at a tire section and the lower belt layer (B) has a belt width such that both end portions thereof extend to tread shoulder portions. An inclination angle of the steel cords of the lower belt layer (B) relative to a tire circumferential direction is set to be larger than that of the upper belt layer (A). A ratio $(Mb_2 \cdot N_2)/(Mb_1 \cdot N_1)$ of a product of a bending rigidity $Mb_2$ per steel cord of the lower belt layer (B) and the number $N_2$ of the steel cords per unit width of the lower belt layer (B) to a product of a bending rigidity $Mb_1$ per steel cord of the upper belt layer (A) and the number $N_1$ of the steel cords per unit width of the upper belt layer (A) is set to be at a range of 0.2 to 0.65.

9 Claims, 3 Drawing Sheets

HEAVY DUTY PNEUMATIC RADIAL TIRE FOR RUNNING ON ROUGH GROUND SURFACE

BACKGROUND OF THE INVENTION

The present invention relates to a heavy duty pneumatic radial tire for running on rough ground surfaces, more particularly to a heavy duty pneumatic radial tire for running on rough ground surfaces which is capable of possessing both an envelope property and a cutting resistance of a shoulder portion, without degrading tire durability.

For example, a heavy duty pneumatic radial tire for use in large construction vehicles such as loaders receives shocks and cutting scratches on its tread portion by various projections such as broken stones, when it runs on rough ground surfaces. For this reason, cutting resistance which prevents the cutting scratches from easily reaching an inner surface of the tire, as well as an envelope property which follows so as to envelop the projections on the surfaces are required for structures of the tread portion.

Accordingly, heavy duty pneumatic radial tires for running on rough ground surfaces generally use non stretchable steel cords of a breaking elongation ratio of 4% or less for their reinforcement cords of belt layers in the tread portion, resulting in security of the cutting resistance property of the tire. Moreover, the whole width of the foregoing belt layers are made narrower than that of other belt layers used for general purpose radial tires in order to reduce the bending rigidity of the shoulder portion, whereby the foregoing heavy duty pneumatic radial tires are designed so as to possess the envelope property. However, although narrowing the whole width of the belt layers gives the envelope property for the foregoing radial tires, the cutting resistance at the shoulder portion is deteriorated.

For a countermeasure to the cutting resistance of the shoulder portion, as shown in FIG. 5, there has been proposed a technology that among a plurality of belt layers 17 arranged in a tread portion a width of the innermost belt layer 17X alone is extended to a shoulder portion 11A so as to widen the layer 17X, in a heavy duty pneumatic radial tire for running on rough ground surfaces which comprises a tread portion 11, a side wall portion 12, a carcass layer 14 and belt layers 17. However, the belt layer 17X of a high bending rigidity extends deeply to the shoulder portion 11A which is greatly deformed, whereby an edge thereof is easy to have an edge separation. Therefore, the belt layer 17X can not extend to the shoulder portion with a large width to keep good a belt durability. Accordingly the cutting resistance can not improve much. Additionally, as the belt layer of high bending rigidity extends to the shoulder portion, the envelope property is deteriorated.

Moreover, as another countermeasure other than the above, there is a technical proposal that a belt layer 17Y made of a stretchable steel cord of a breaking elongation ratio of 6% or more is provided on the outermost side of the belt layer 17 so as to extend to the shoulder portion 11A with a large width. However, the additional provision of the belt layer 17Y in the outside of the belt layer 17 increases the thickness of the tread portion, resulting in an increase in generation of heat. Therefore, this proposal necessarily solves the problem that the edge separation tends to occur in the edge portion so that the belt durability is reduced.

SUMMARY OF THE INVENTION

In a heavy duty pneumatic radial tire for running on rough ground surfaces, the object of the present invention is to provide a heavy duty pneumatic radial tire for running on rough ground surfaces which is capable of possessing both an envelope property and cutting resistance of a shoulder portion, without degrading belt durability.

A heavy duty pneumatic radial tire for running on rough ground surfaces of the present invention to achieve the foregoing object has a structure that at least one carcass layer is provided between right and left bead portions, and at least two belt layers formed of steel cords of a breaking elongation ratio of 4% or less are provided at an external periphery of the carcass layer in a tread portion, the belt layers comprising at least one upper belt layer (A) having a belt width of 0.6 times or less of a carcass line maximum width SW of the foregoing carcass layer at a tire section and at least one lower belt layer (B) having a belt width so that both end portions thereof extend to both tread shoulder portions, respectively, wherein an inclination angle of the steel cords of the lower belt layer (B) relative to a tire circumferential direction is set to be larger than that of the upper belt layer (A), and a ratio $r=(Mb_2 \cdot N_2)/(Mb_1 \cdot N_1)$ of the product of a bending rigidity $Mb_2$ per steel cord of the foregoing lower belt layer (B) and the number $N_2$ of the steel cords per unit width of the foregoing lower belt layer (B) to the product of a bending rigidity $Mb_1$ per steel cord of the foregoing upper belt layer (A) and the number $N_1$ of the steel cords per unit width of the foregoing upper belt layer (A) is set to be at a range of 0.2 to 0.65.

Since the ratio r of the products of the bending rigidities per steel cord and the numbers of the steel cords per unit width in the lower belt layer (B) extending to the shoulder portions and the upper belt layer (A) of the narrow width is set to the above described range and a value of the product of the lower belt layer (B) is smaller than that of the upper belt layer (A), the bending rigidity of the lower belt layer (B) can be reduced while operating it as a tension member. Therefore the shoulder portions can be easily deformed, extending the lower belt layer (B) to the shoulder portions. As a result, the envelope property can be secured.

Since the bending rigidity of the lower belt layer (B) is lower, an edge separation can be restrained, compared with a conventional belt layer having a high bending rigidity. In addition, directions of main distortion components working at each belt edge between the time of a contact state and the time of a non-contact state can be closer since an inclination angle of the steel cords of the lower belt layer (B) having a wide width is set to be larger than that of a conventional one. As a result, an edge separation, due to a difference between directions of the distortion components concentrating on the belt edges, can be restricted. Accordingly, the lower belt layer can extend to the shoulder portions with a large width than the conventional belt layer which extends to the shoulder portions, securing belt durability of a same level as that of the conventional belt layer. Therefore, the cutting resistance of the shoulder portions can be greatly enhanced. Furthermore, the heavy duty pneumatic radial tire of the present invention eliminates the need for an additional belt layer that is necessary in the conventional tire, so that an increase in the quantity of the heat generation at the tread portion is never brought about. Therefore, belt durability is not lowered.

DETAILED DESCRIPTION OF THE PREFERRED EMBODIMENTS

Figure 1:
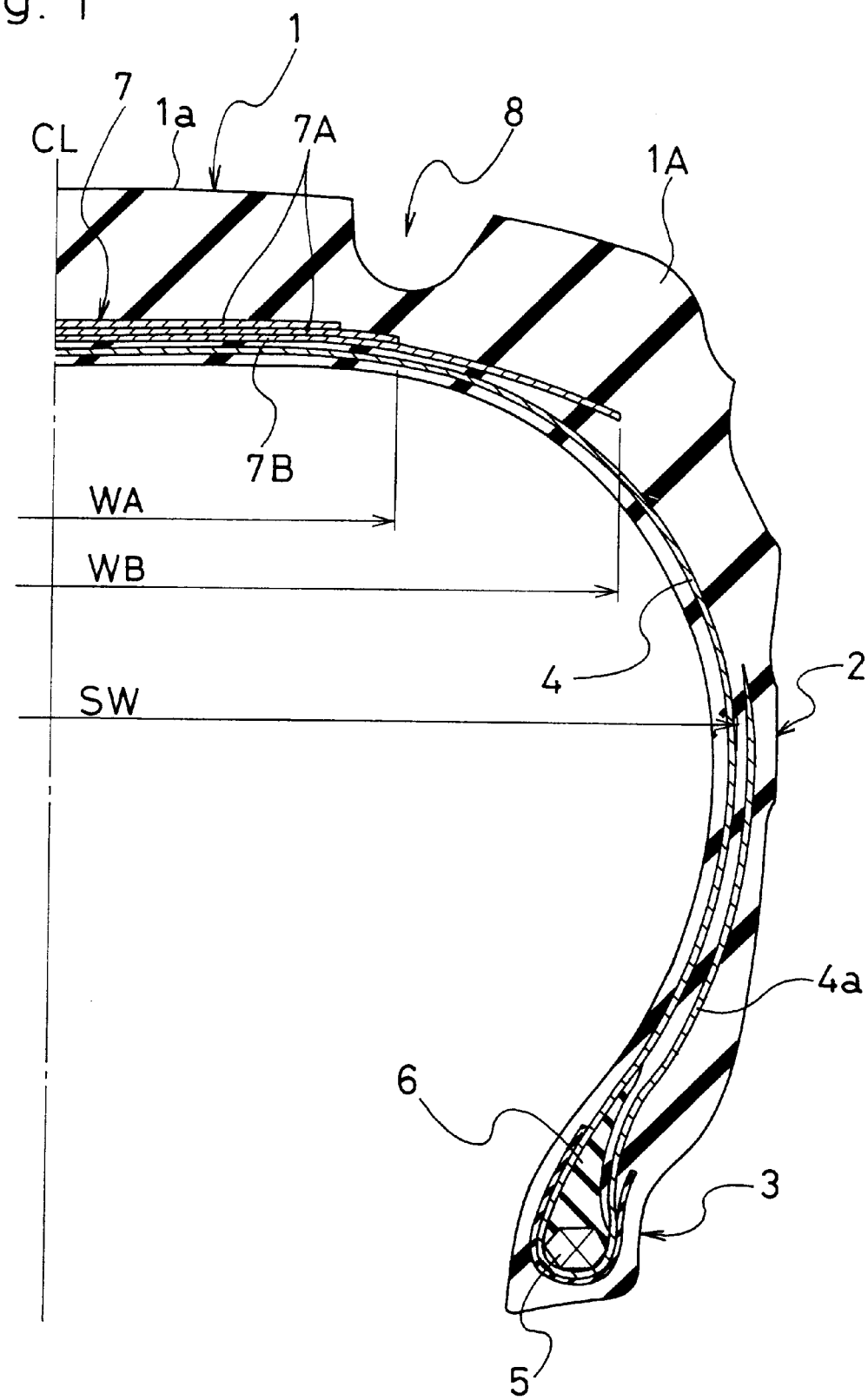
FIG. 1 is a tire meridian half section view showing an example of a heavy duty pneumatic radial tire for running on rough ground surfaces of the present invention.

Referring to FIG. 1, reference numeral 1 denotes a tread portion; 2, a side wall portion; 3, a bead portion; and CL, a tire center line. In an inner portion of the tire, one carcass layer 4 is provided between right and left bead portions 3. Both end portions 4a of the carcass layer 4 are folded back from the inside of the tire to the outside thereof around each bead core 5 so as to envelop a bead filler 6. Three belt layers 7 functioning as a tension member are laid on an outer circumference side of the carcass layer 4 in the tread portion 1. In a tread surface 1a, circumferential direction grooves 8 are provided extending in the circumferential direction of the tire.

The three belt layers 7 comprise two upper layers (A) 7A and one lower belt layer (B) 7B. Each of the two upper layers (A) 7A has a belt width $W_A$ that is 0.6 times or less of the carcass line maximum width SW of the carcass layer 4 when viewed from the section. The lower belt layer (B) 7B has a belt width of $W_B$, both ends of which extend to corresponding shoulder portions 1A, respectively. The lower belt layer (B) 7B is arranged in a first belt layer and the upper belt layers (A) 7A are arranged in second and third belt layers. The upper belt layers (A) 7A are constructed by arranging non-stretchable steel cords which are formed of a plurality of steel filaments. They are twisted into each cord. A diameter of each filament is 0.26 mm to 0.38 mm. The lower belt layer (B) 7B is constructed by arranging non-stretchable steel cords which are formed of a plurality of steel filaments. They are twisted into each cord. A diameter of each filament is 0.15 mm to 0.22 mm and is smaller than that of the steel filaments of the upper belt layers (A) 7A. It should be noted that the non-stretchable steel cords used in this embodiment are the one exhibiting a stretching ratio of 4% or less at the time of breaking, more preferably, 3% or less.

A ratio $r=(Mb_2 \cdot N_2)/(Mb_1 \cdot N_1)$ of the product $(Mb_2 \cdot N_2)$ of a bending rigidity $Mb_2$ (kgf·mm²) per steel cord constituting the lower belt layer (B) 7B and the number $N_2$ (pieces /50 mm) of the steel cords per unit width of the lower belt layer (B) to the product $Mb_1 \cdot N_1$ of a bending rigidity $Mb_1$ (kgf·mm²) per steel cord constituting the upper belt layers (A) 7A and the number $N_1$ (pieces /50 mm) of the steel cords per unit width of the upper belt layer (A) is set to be at a range of 0.2 to 0.65. The bending rigidity referred to can be obtained by the following formula.

$$Mb = 21000 \times (\pi/64) \times \sum_{i}^{i=n} d_i^4$$

where $d_i$ is a diameter (mm) of each steel filament constituting one steel cord and n is the number of the steel filaments constituting one steel cord.

Figure 2:
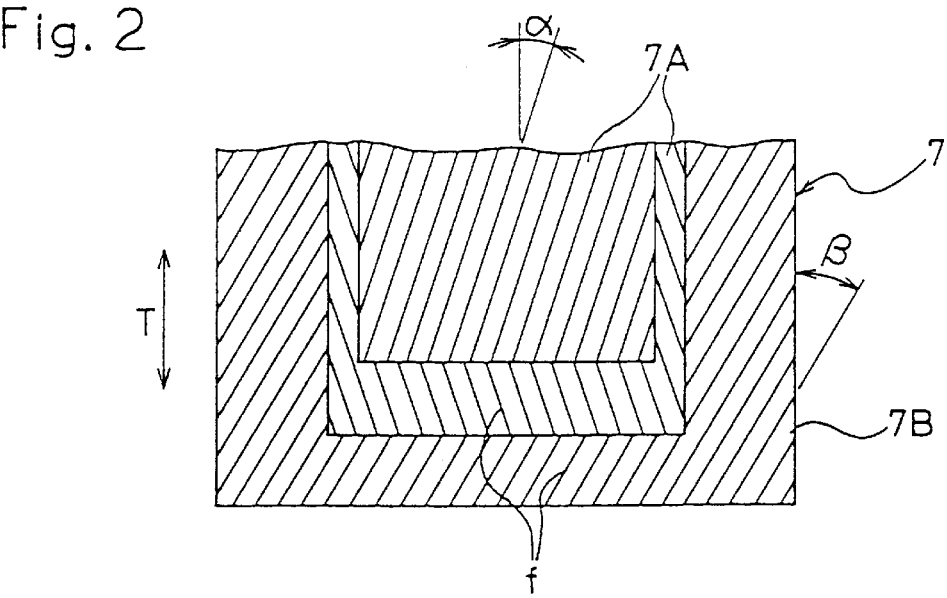
FIG. 2 is a principal and partially cutaway plan view of belt layers of FIG. 1.

As shown in FIG. 2, each of the lower and upper belt layers 7A, 7A and 7B is arranged so that the steel cords f cross each other forming reverse inclination angles relative to the tire circumferential direction T between the belt layers. An inclination angle β of the steel cords f of the lower belt layer (B) 7B relative to the tire circumferential direction T is set to be larger than an inclination angle α of the steel cords f of the upper belt layers (A) 7A relative to the tire circumferential direction T. In addition, the breaking strengths (kgf/50 mm) per unit width of each belt layer are approximately the same.

As described above, in the present invention, as the ratio r of the products of the bending rigidities per steel cord to the numbers of the steel cords per unit width in the lower belt layer (B) 7B extending to the shoulder portions 1A and the upper belt layers (A) 7A of a narrow width is set to the above described range and a value of the product of the lower belt layer (B) 7B is smaller than that of the upper belt layers (A) 7A, the bending rigidity of the lower belt layer (B) 7B can be reduced. As a result, the lower belt layer (B) 7B, which extends to the shoulder portions 1A, can be easily deformed and an envelope property can be obtained. As the lowest value of the ratio r of the products is described above, the lower belt layer (B) 7B can not fail to function as a tension member.

Figure 3A:
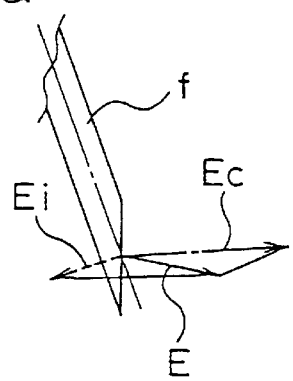
FIG. 3a is an explanation view of main distortion components working at each edge of steel cords of a belt layer which extends to a shoulder portion and has a conventional inclination angle of the steel cords.
Figure 3B:
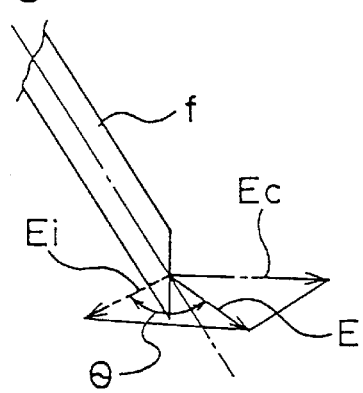
FIG. 3b is an explanation view of main distortion components working at each edge of steel cords of a belt layer which extends to a shoulder portion and has a higher inclination angle of the steel cords than the conventional one.

Since the bending rigidity of the lower belt layer (B) 7B is lower, edge separation can be restricted, compared with a conventional belt layer with high bending rigidity. And as the lower belt layer has a larger inclination angle of the steel cords than that of a conventional belt layer, direction between a contact distortion component which comprises a main distortion component arising from contact reaction force at each edge of the steel cords and a main distortion component arising from inner pressure of the tire at the same each edge and a non-contact distortion component arising from the inner pressure can be closer. Namely, a main distortion component $E_c$ with a belt width direction which tries to expand the belt layer to the direction by contact reaction force and a main distortion component $E_i$ of a perpendicular direction to a direction of a steel cord axis by inner pressure of the tire occur at each edge of the steel cords of the belt layer. The each edge of the steel cords receives the main distortion component $E_i$ only at the time of a non-contacting state. As shown in FIG. 3a, each edge of steel cords f of a belt layer having a conventional low inclination angle of about 20° receives a contact distortion component E and a non-contact distortion component $E_i$ which act in reverse directions. As shown in FIG. 3b, each edge of the steel cords f of the belt layer with a larger inclination angle receives a contact distortion component E and a non-contact distortion component $E_i$ which act in closer directions (angle θ is smaller than that in FIG. 3a).

The distortions described above attack at the each edge repeatedly again and again. Such closer directions thereof can make a result of restraint of an edge separation. Accordingly the lower belt layer (B) 7B can extend to both shoulder portions 1A wider than the belt layer 17X of FIG. 5, maintaining a belt durability of the same level as that of the conventional tire in FIG. 5. Therefore cutting resistance can be greatly improved. Moreover, since the heavy duty pneumatic radial tire of the present invention may be constituted simply by modifying the steel cord structure of the belt layer functioning as a tension member without adding another belt layer as is conventional, the quantity of generated heat in the tread portion I is not increased. Therefore, belt durability is not deteriorated.

When the ratio $(Mb_2 \cdot N_2)/(Mb_1 \cdot N_1)$ is less than 0.2, the bending rigidity is too low so that it will be difficult for the lower belt layer (B) to function as a tension member. On the contrary, when the ratio exceeds 0.65, the bending rigidity is too high so that the shoulder portions are not prone to deformation, thereby deteriorating the envelope property and lowering belt durability. The maximum value of the ratio can be preferably 0.6. In the present invention, the belt width $W_A$ of each of the upper belt layer (A) 7A can be set to be 0.6 times or less of the carcass line maximum width SW as described above. The low limitation value thereof can be set to be 0.4 SW ($0.4 \leq W_A/SW \leq 0.6$). When $W_A/SW$ is smaller than 0.4 and the belt effective width is in such a narrow state, it will be difficult to keep the shape of the tire under inner pressure thereof. On the contrary, when $W_A/SW$ is larger than 0.6, the envelope property is deteriorated.

The ratio $W_B/SW$ of the belt width $W_B$ of the lower belt layer (B) to the carcass line maximum width SW can be preferably set to be larger than the foregoing ratio $W_A/SW$ by 0.2 or more. As the upper limit of the lower belt width $W_B$, the ratio $W_B/SW$ can be set to 0.9 for the carcass line maximum width SW. That is, the lower belt layer (B) can extend to both positions of 0.45 SW in the tire width direction from the tire center line CL at maximum.

The inclination angle β of the steel cords f of the lower belt layer (B) relative to the tire circumferential direction can be preferably set to 25° to 37°. When the inclination angle β is less than 25°, two directions of the contact distortion component E and the non-contact distortion component $E_i$ can not be closer effectively, so that it will be prone to produce an edge separation in the belt layer (B). On the contrary, when the inclination angle β exceeds 37°, problems of deteriorations of a hoop effect of the belt layer and durability due to an increase of the tire bending rigidity in the tread longitudinal sectional direction are created. And a direction of the contact distortion component E is so close to the axis direction of the steel cord f that it makes a cause of an edge separation. The inclination angle α of the steel cords of the upper belt layers (A) relative to the tire circumferential direction is the same as that of the conventional tire, and it can be set to 18 to 22 degrees.

In the above described embodiment of the present invention, a example of the tire having three belt layers 7 is described. But the present invention is not limited to this, and it is sufficient that at least two belt layers may be provided. Specifically, the tire of the present invention is sufficient as long as it comprises at least one upper belt layer (A) and at least one lower belt layer (B) disposed at the inside of the upper layer (A). The lower belt layer (B) with a wide width can be preferably provided by one as the first belt layer that is the innermost layer, but one to three lower belt layers may be provided according to the number of belt layers. Moreover, concerning the carcass layer 4, in the above described embodiment of the present invention, the example in which the carcass layer 4 is provided by one is described. It is sufficient that more than one carcass layer may be provided. The number of the carcass layer 4 may be at least one.

The present invention can be employed for heavy duty pneumatic radial tires of a rim diameter size of 24 inches or more, which are used for construction vehicles running on rough ground surfaces, for example, loaders.

EMBODIMENT

Figure 5:
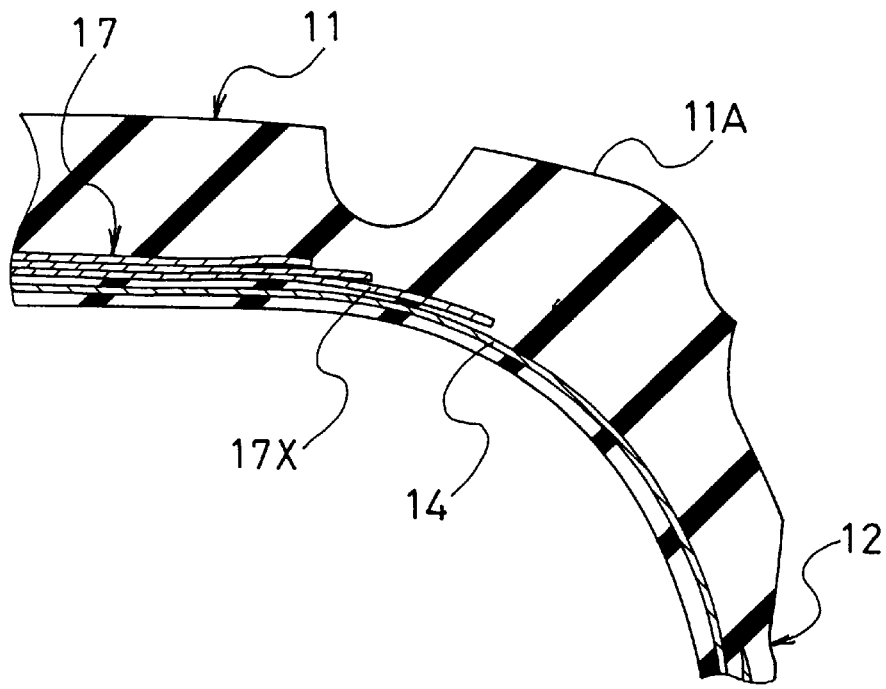
FIG. 5 is a tire meridian principal section view showing an example of a conventional heavy duty pneumatic radial tire for running on rough ground surfaces.
Figure 6:
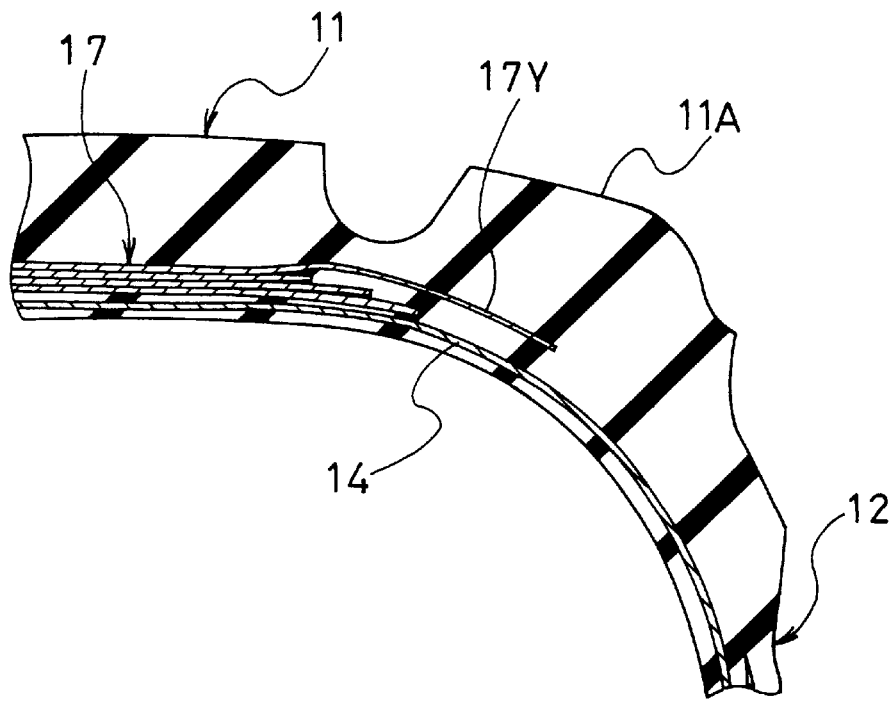
FIG. 6 is a tire meridian principal section view showing another example of a conventional heavy duty pneumatic radial tire for running on rough ground surfaces.

Tires of the present invention 1–3 and comparative tires 1, 2 having the ratio r tabulated in table 1 and a structure shown in FIG. 1 in which a lower belt layer (B) as the innermost belt layer and two upper belt layers as the second and third belt layers are disposed and the inclination angle β of the steel cords of the lower belt layer (B) is larger than that of the upper belt layers (A), a comparative tire 3 having the same ratio r and structure as those of the tire of present invention 2 except that the inclination angle β of the steel cords of the lower belt layers is the same as that of the upper belt layer, a conventional tire 1 having a structure shown in FIG. 5 in which three belt layers are formed of upper belt layers and the innermost belt layer is wider to both shoulder portions, and a comparative tire 2 having a structure shown in FIG. 6 in which three belt layers are upper belt layers and a protective belt layer with a large width constituted by arranging stretchable steel cords is disposed on the outermost belt layer were produced. The tire sizes of all of them are 20.5R25.

The constitution of the innermost belt layer in each of the test tires and the constitution of the protection belt layer used in the conventional tire 2 are as follows. In each of the test tires, the structures of the upper belt layers disposed for the second and third belt layers are the same and the structure is described below.

Tire of Present Invention 1
    Structure of Steel Cord: (3+9+15)×0.22
    Breaking Strength of Steel Cord: 205 kgf/cord
    Bending Rigidity of Steel Cord: 29 kgf·mm$^2$
    Breaking Elongation of Steel Cord: 2.5%
    Inclination Angle of Steel Cord: 31 degrees
    Number of Buried Steel Cords: 33 pieces/50 mm
    Belt Width: 395 mm
Tire of Present Invention 2
    Structure of Steel Cord: (3+9+15)×0.22+0.15
    Breaking Strength of Steel Cord: 270 kgf/cord
    Bending Rigidity of Steel Cord: 65 kgf·mm$^2$
    Breaking Elongation of Steel Cord: 2.5%
    Inclination Angle of Steel Cord: 31 degrees
    Number of Buried Steel Cords: 25 pieces/50 mm
    Belt Width: 395 mm
Tire of Present Invention 3
    Structure of Steel Cord: (3+9)×0.27
    Breaking Strength of Steel Cord: 205 kgf/cord
    Bending Rigidity of Steel Cord: 66 kgf·mm$^2$
    Breaking Elongation of Steel Cord: 2.5%
    Inclination Angle of Steel Cord: 31 degrees
    Number of Buried Steel Cords: 33 pieces/50 mm
    Belt Width: 395 mm
Comparative Tire 1
    Structure of Steel Cord: (2+7)×0.30
    Breaking Strength of Steel Cord: 190 kgf/cord
    Bending Rigidity of Steel Cord: 75 kgf·mm$^2$
    Breaking Elongation of Steel Cord: 2.5%
    Inclination Angle of Steel Cord: 31 degrees
    Number of Buried Steel Cords: 35.5 pieces/50 mm
    Belt Width: 395 mm
Comparative Tire 2
    Structure of Steel Cord: (2+7)×0.30
    Breaking Strength of Steel Cord: 210 kgf/cord Bending Rigidity of Steel Cord: 97 kgf·mm$^2$
Breaking Elongation of Steel Cord: 2.5%
Inclination Angle of Steel Cord: 31 degrees
Number of Buried Steel Cords: 32 pieces/50 mm
Belt Width: 395 mm
Comparative Tire 3
  Inclination Angle of Steel Cord: 22 degrees
  (Specifications otherwise the same as the tire of the present invention 2.)
Conventional Tire 1
  Structure of Steel Cord: 3×0.32+8×0.35
  Breaking Strength of Steel Cord: 283 kgf/cord
  Bending Rigidity of Steel Cord: 156 kgf·mm$^2$
  Breaking Elongation of Steel Cord: 2.7%
  Inclination Angle of Steel Cord: 22 degrees
  Number of Buried Steel Cords: 24 pieces/50 mm
  Belt Width: 320 mm
Conventional Tire 2
  Belt Width: 270 mm
  (Specifications of the innermost belt layer otherwise the same as the conventional tire 1.)
  Protection Belt Layer
  Structure of Steel Cord: 4×2×0.32
  Breaking Strength of Steel Cord: 127 kgf/cord
  Bending Rigidity of Steel Cord: 76 kgf·mm$^2$
  Breaking Elongation of Steel Cord: 6.1%
  Inclination Angle of Steel Cord: 22 degrees
  Number of Buried Steel Cords: 19 pieces/50 mm
  Belt Width: 360 mm
  Second and Third Belt Layer
  Structure of Steel Cord: 3×0.32+8×0.35
  Breaking Strength of Steel Cord: 283 kgf/cord
  Bending Rigidity of Steel Cord: 156 kgf·mm$^2$
  Breaking Elongation of Steel Cord: 2.7%
  Number of Buried Steel Cords: 24 pieces/50 mm
  Second Belt Layer
  Inclination Angle of Steel Cord: 22 degrees
  Belt Width: 240 mm
  Third Belt Layer
  Inclination Angle of Steel Cord: 20 degrees
  Belt Width: 195 mm
After each of the test tires is fitted to the rim having a rim size of 25×17.00 (2.0), keeping the air pressure at 500 kPa, evaluation tests for cutting resistance, envelope property, heat generation and belt durability were conducted under the measurement conditions described below. As a result of the tests, the following results shown in Table 1 were obtained.

Figure 4A:
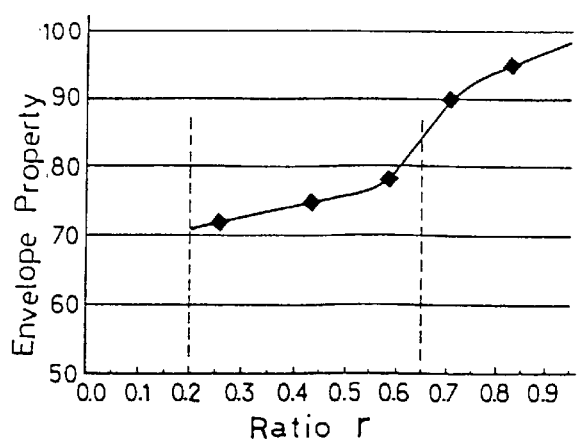
FIG. 4a is a graphic view showing results of measurement of an envelope property wherein a ratio $(Mb_2 \cdot N_2)/(Mb_1 \cdot N_1)$ is changed.
Figure 4B:
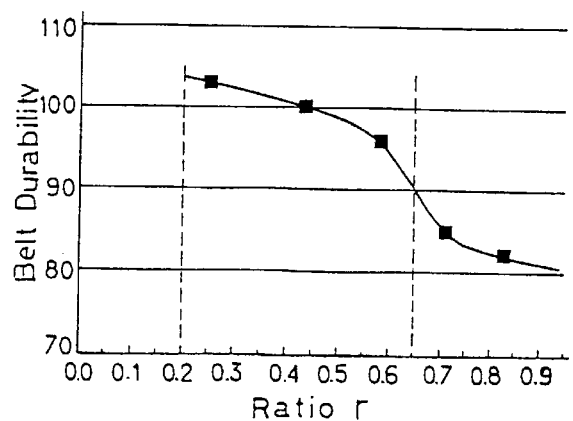
FIG. 4b is a graphic view showing results of measurement of belt durability wherein a ratio $(Mb_2 \cdot N_2)/(Mb_1 \cdot N_1)$ is changed.

Graphs of envelope property and belt durability plotting the test results of the tires 1–3 of the present invention and comparative tires 1, 2 are also shown in FIGS. 4a and 4b. A tire having belt layers of the ratio $(Mb_2·N_2)/(Mb_1·N_1)$ which is less than 0.2 was produced r=0.15), but the lower belt layer could not function as a tension member.

Cutting Resistance:

After each of the test tires was fitted to the front side of the shovel loader, the running times until the penetration scratches occurred in the tread portion (shoulder portion) were measured in a broken stone pit. The measurement results were evaluated with an exponential value referencing the conventional tire as 100. The larger the exponential value, the more excellent the cutting resistance.

Envelope Property:

After each of the test tire was fitted to a rotary drum testing machine having a rotary drum where a semicircular projection of a diameter 80 mm is provided on a part of a surface of the drum, the tire ran in such a condition that a speed was 10 km/h and a load was 9500 kg, and impact acceleration was measured when a shoulder portion of the tire ran on the projection. The measurement results were evaluated with an exponential value referencing the conventional tire as 100. The smaller the exponential value, the more excellent the envelope property.

Heat Generation:

After each of the test tires was fitted to a rotary drum testing machine, the speed is increased in steps of 5 km/h, 10 km/h and 15 km/h under the condition of applying of a load of 8100 kg, and the elevation of temperature of the tire was measured during the time of testing. The measurement results were evaluated with the exponential value referencing the conventional tire 1 as 100. It is proved that as the exponential value is larger, the elevation of the temperature is smaller and the quantity of heat generation is lower.

Belt Durability

After each of the test was fitted to a drum of the rotary drum testing machine on the circumferential surface thereof, the drum having a square-shaped iron rod of 80 mm×80 mm fixed at several positions on its circumferential surface, a running time was measured under the conditions of the load of 9500 kg and the speed of 8 km/h until the troubles of the belt occur. The measurement results were evaluated with the exponential value referencing the conventional tire 1 as 100. As the exponential value is larger, the belt durability is more excellent.

TABLE 1

|  | Tire 1 of the Present Invention | Tire 2 of the Present Invention | Tire 3 of the Present Invention | Comparative Tire 1 | Comparative Tire 2 | Comparative Tire 3 | Conventional Tire 1 | Conventional Tire 2 |
|---|---|---|---|---|---|---|---|---|
| (Ib2)/(Ib1) | 0.26 | 0.43 | 0.58 | 0.71 | 0.83 | 0.43 | 1 | 1 |
| Cutting Resistance Property | 125 | 125 | 125 | 125 | 125 | 125 | 100 | 110 |
| Envelope Property | 72 | 75 | 78 | 90 | 95 | 75 | 100 | 87 |
| Heat Generation Property | 100 | 100 | 100 | 100 | 100 | 100 | 100 | 90 |
| Belt Durability | 103 | 100 | 96 | 85 | 82 | 88 | 100 | 85 |

As is apparent from the Table 1, it is proved that the tires of the present invention are capable of possessing the excellent envelope property and high cutting resistance of the shoulder portion, keeping the belt durability and the low heating generation which are at the same levels as those of the conventional tire 1. It can be said that the belt durability of the value equal to 90 or more is the same level as that of the conventional tire 1. And it can be said that the envelope property of the value equal to 85 or less is in a good condition.

As described above, in the tire of the present invention, since the lower belt layer (B) is constructed so as to extend to the shoulder portions and the ratio of the products of the bending rigidities per steel cord and the numbers of the steel cords per unit width in the lower belt layer (B) having a wide width and the upper belt layer (A) having a narrow width are set to be the foregoing range, both the envelope property and cutting resistance can be secured.

Since the lower belt layer (B) has the low bending rigidity, an edge separation can be restrained, compared with the conventional belt layer having the higher bending rigidity. Moreover the inclination angle of the steel cords of the lower belt layer (B) is larger, the occurrence of the edge separation due to difference between the directions of the distortion components which act at the edges of the lower belt layers can be lowered. The quantity of the heat generation in the tread portion never increases, as a new belt layer described in the prior art is not provided. Therefore belt durability can be kept in a good condition even though the lower belt layer extends deeply to the shoulder portions to improve the cutting resistance greatly.

Although preferred embodiment of the present invention has been described in detail, it should be understood that various changes, substitutions alternations can be made therein without departing from spirit and scope of the inventions as defined by the appended claims.

What is claimed is:

1. A heavy duty pneumatic radial tire for running on rough ground surfaces comprising:

at least one carcass layer being provided between right and left bead portions; and at least two belt layers formed of steel cords arranged in an outer periphery of said at least one carcass layer in a tread portion, said steel cords exhibiting a breaking elongation of 4% or less, wherein said belt layers comprise at least one upper belt layer (A) and at least one lower belt layer (B), said at least one upper belt layer (A) having a belt width that is 0.6 times or less of a carcass line maximum width SW at a tire cross-section and said at least one lower belt layer having a belt width such that both end portions thereof extend to tread shoulder portions, an inclination angle of the steel cords of said at least one lower belt layer (B) relative to the tire circumferential direction is set to be larger than that of said at least one upper belt layer (A), and a ratio $r=(Mb_2 \cdot N_2)/(Mb_1 \cdot N_1)$ of a product of a bending rigidity $Mb_2$ per steel cord of said at least one lower belt layer (B) and the number $N_2$ of the steel cords per unit width of said at least one lower belt layer (B) to a product of a bending rigidity $Mb_1$ per steel cord of said at least one upper belt layer (A) and the number $N_1$ of the steel cords per unit width of said at least one upper belt layer (A) is set to be at a range of 0.2 to 0.65.

2. The heavy duty pneumatic radial tire for running on rough ground surfaces according to claim 1, wherein a diameter of each steel filament constituting the steel cords of said at least one lower belt layer (B) is set to be smaller than that of said at least one upper belt layer (A).

3. The heavy duty pneumatic radial tire for running on rough ground surfaces according to claim 1, wherein a ratio $W_A/SW$ of a belt width $W_A$ of said at least one upper belt layer (A) to said carcass line maximum width SW is set to be 0.4–0.6 and a ratio $W_B/SW$ of a belt width $W_B$ of said at least one lower belt layer (B) to said carcass line maximum width SW is larger than the ratio of $W_A/SW$ by 0.2 or more.

4. The heavy duty pneumatic radial tire for running on rough ground surfaces according to claim 3, wherein said ratio $W_B/SW$ is set to be at a range of $W_A/SW+0.2 \leq W_B/SW \leq 0.9$.

5. The heavy duty pneumatic radial tire for running on rough ground surfaces according to claim 1, wherein a breaking strength per unit width of said at least one upper belt layer (A) and that of said at least one lower belt layer (B) are approximately the same.

6. The heavy duty pneumatic radial tire for running on rough ground surfaces according to claim 1, wherein an inclination angle β of the steel cords of said at least one lower belt layer (B) relative to the tire circumferential direction is at a range of 25 to 37 degrees.

7. The heavy duty pneumatic radial tire for running on rough ground surfaces according to claim 1, wherein an inclination angle α of the steel cords of said at least one upper belt layer (A) relative to the tire circumferential direction is at a range of 18 to 22 degrees.

8. The heavy duty pneumatic radial tire for running on rough ground surfaces according to claim 2, wherein a diameter of each steel filament constituting each steel cord of said at least one upper belt layer (A) is at a range of 0.26 mm to 0.38 mm and a diameter of each steel filament constituting each steel cord of said at least one lower belt layer (B) is at a range of 0.15 mm to 0.22 mm.

9. The heavy duty pneumatic radial tire for running on rough ground surfaces according to claim 1, wherein the breaking elongation of the steel cords of said belt layers is 3% or less.

* * * * *